US00RE49043E

(19) United States
(12) Reissued Patent
Schwellnus et al.

(10) Patent Number: US RE49,043 E
(45) Date of Reissued Patent: Apr. 19, 2022

(54) APPARATUS AND METHOD FOR COMMUNICATIONS IN A SAFETY CRITICAL SYSTEM

(71) Applicant: THALES CANADA INC., Toronto (CA)

(72) Inventors: Carl Schwellnus, York (CA); Martin Krieger, Toronto (CA)

(73) Assignee: THALES CANADA INC., Toronto (CA)

(21) Appl. No.: 16/295,975

(22) Filed: Mar. 7, 2019

Related U.S. Patent Documents

Reissue of:
(64) Patent No.: 9,589,142
Issued: Mar. 7, 2017
Appl. No.: 14/308,005
Filed: Jun. 18, 2014

(51) Int. Cl.

| | |
|---|---|
| ***G06F 11/00*** | (2006.01) |
| ***G06F 21/60*** | (2013.01) |
| ***G06F 11/16*** | (2006.01) |
| ***G06F 11/18*** | (2006.01) |

(52) U.S. Cl.
CPC ..... *G06F 21/60* (2013.01); *G06F 11/1629* (2013.01); *G06F 11/1654* (2013.01); *G06F 11/181* (2013.01); *G06F 11/184* (2013.01); *G06F 21/606* (2013.01)

(58) Field of Classification Search
CPC ..... G06F 11/18; G06F 11/181; G06F 11/182; G06F 11/183; G06F 11/184; G06F 11/185; G06F 11/186; G06F 11/187; G06F 11/188; G06F 21/30; G06F 21/60–84
See application file for complete search history.

(56) References Cited

U.S. PATENT DOCUMENTS

| | | | | |
|---|---|---|---|---|
| 4,912,762 | A * | 3/1990 | Lee | G06Q 20/3829 235/379 |
| 6,105,064 | A * | 8/2000 | Davis | H04L 47/10 709/224 |
| 7,010,450 | B2 | 3/2006 | Law et al. | |
| 7,130,703 | B2 | 10/2006 | Ott et al. | |
| 7,920,549 | B2 * | 4/2011 | Alt | H04L 63/0281 370/352 |
| 2001/0025351 | A1 * | 9/2001 | Kursawe | G06F 11/187 714/4.1 |
| 2002/0044552 | A1 * | 4/2002 | Vialen | H04L 63/08 370/389 |
| 2009/0116502 | A1 * | 5/2009 | Hall | G06F 11/182 370/406 |
| 2011/0202163 | A1 | 8/2011 | Kim et al. | |
| 2012/0096314 | A1 | 4/2012 | Motika et al. | |

OTHER PUBLICATIONS

International Search Report for corresponding International PCT Application No. PCT/IB2015/051384, dated Sep. 22, 2015.
Vittal, et al. "Transient Instability Risk Assessment." IEEE Power Engineering Society Summer, Dec. 31, 1999, vol. 1, pp. 206-211.

* cited by examiner

*Primary Examiner* — Robert L Nasser
(74) *Attorney, Agent, or Firm* — Hauptman Ham, LLP

(57) ABSTRACT

A safety communication scheme for a safety-critical system which includes two or more higher level units that have voting capabilities and one or two sets of lower level units that do not have voting capabilities, involves using one channel between the high and low level units for safety and two channels for redundancy.

22 Claims, 6 Drawing Sheets

600

APPARATUS AND METHOD FOR COMMUNICATIONS IN A SAFETY CRITICAL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Safety critical systems are used to monitor condition values and parameters of a system within specified operational limits. For example, some safety critical systems include high level units such as processors or central processing units, and low level units such as input/output ("I/O") modules or replicas of high level units. When a risk condition occurs, such as an indication that a low level unit or a device associated with the low level unit is malfunctioning, safety critical systems are often configured to trigger an alarm and/or place the system in a safe condition or a shutdown condition.

Safety critical systems rely on various voting principles such as a two out of two ("2oo2") voting principle, a two out of three ("2oo3") voting principle, another voting principle, or combination thereof, to determine whether a system is operating normally or if there is a cause for concern. Usually, for systems with a voting function, all input is distributed between all units. Then, each unit within the system processes the input independently, and determines an output. The output is voted by exchanging the information between all voting units. The voting units have to agree on an output. Any unit that disagrees from the majority among the voting units is restricted from generating an output. Voting functions are usually limited to high level units in safety critical systems because of the complexity of the voting function, which requires exchanging information between all of the voting units.

Communication between high level units and low level units are often complicated. For example, in safety critical systems that employ the 2oo2 voting principle, to maintain communication between multiple high level units and multiple low level units in a safety critical system, the 2oo2 voting principle requires that at least two communication channels are available at all times within the system. Similarly, a safety critical system that employs a 2oo3 to 2oo3 voting principle also requires that at least two communication channels are available at all times to maintain operation. Some safety critical systems employ combinations of voting principles such as a 2oo3 to 2×2oo2. These systems require a single communication channel to be available between high level units and low level units, but also require two communication channels to each low level unit to be available.

Though voting rights are generally limited to high level units in safety critical systems, some safety critical systems are configure to include low level units that employ voting capabilities that require cross-communication channels, and relatively complex software, to exchange information between the low level units and the high level units, which further complicates communication within the safety critical system.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

Figure 1:
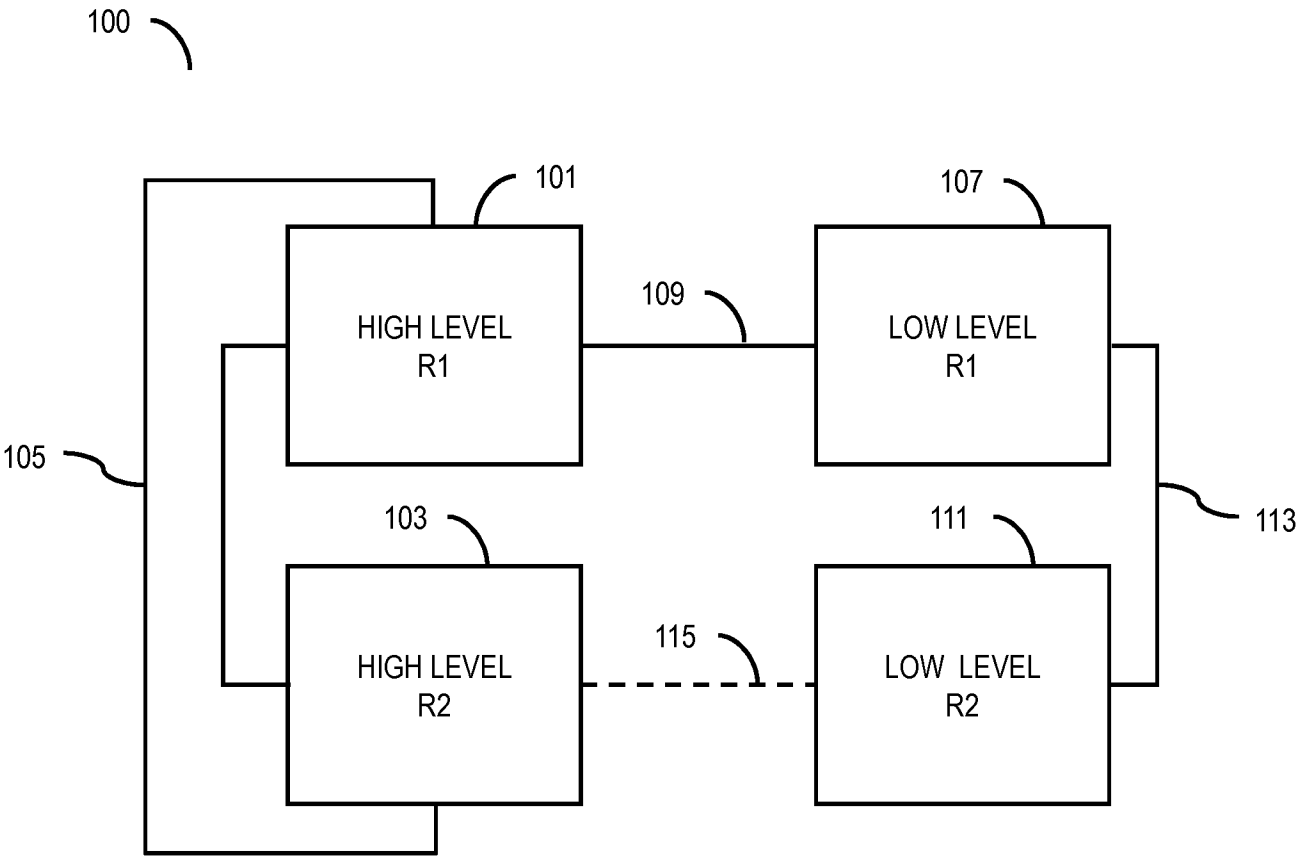
FIG. 1 is a diagram of a system configured to provide simplified communication for safety critical systems, in accordance with one or more embodiments.

The following disclosure provides many different embodiments, or examples, for implementing different features of the invention. Specific examples of components and arrangements are described below to simplify the present disclosure. These are examples and are not intended to be limiting.

As used herein, the term "unit" refers to one or more of a processor, a central processing unit, a controller, a control module, a communication module, or other suitable communication unit or module configured to be implemented in a safety critical system.

As used herein, the term "high level unit" refers to one or more units configured to have one or more of voting capabilities in a safety critical system, control capabilities of one or more other units in a safety critical system, the capability to generate messages to be communicated to one or more other units of a safety critical system, or the ability to process received messages from one or more other units of a safety critical system.

As used herein, the term "low level unit" refers to one or more units configured to be in communication with one or more high level units, *and* generate messages in response to received messages from one or more high level units[, and/or]. *Low-level units are free from having voting capabilities. In some embodiment, one or more low level units are configured to* be replicas of one or more high level units*, but without voting capabilities.*

As used herein, the terms "voting," "voting process," or derivation thereof refers to a process by which multiple high level [and/or low level] units having voting capabilities or rights exchange data such as content to be distributed in or with a transmitted message, and decide to agree or disagree on whether the distributed content is to be included in the transmitted message. For example, sometimes the voting units have to agree on the content that is to be included in the transmitted message, and any unit that disagrees from a primary high level unit or a majority of units having voting capabilities is restricted from generating a message to be transmitted. Some voting processes are directed by a primary high level unit such that the primary high level unit counts votes or dictates what the data content should be. Some voting processes determine data content on a majority rules basis. Sometimes the majority rules basis is tabulated by the primary high level unit. Some voting processes do not generate a message to be transmitted until all of the units having voting capabilities agree, whether it be immediately or through negotiation, on the data content such that the content decision is unanimous. A content decision that requires a unanimous agreement on the content of a generated message is, for example, enforced by a message protection program or code that limits message generation by the high level and/or low level units until a confirmation is made that all of the units agree on the content of the message to be generated. In order to prevent an acceptable message that has not been voted from being sent, no single [unit,] high level [or low level,] *unit* in a voting group has the capability to generate a message on its own.

As used herein, the term "voted message," or derivation thereof refers to a message comprising data content that has been subjected to a voting process to determine content of the message, the content being (1) agreed upon between units having voting capabilities, (2) dictated by a primary high level unit, or (3) dictated by a majority of units having voting capabilities.

Common safety critical systems involve communicating messages between high level units such as central processing units (CPU's) and low level units such as input/output (I/O) controllers. [Communications in common safety critical systems often rely on two different strategies for reliable functionality. An employed communication strategy usually depends on the level of sophistication of the low level processor units. For example, if a low level unit has full interconnection, voting capabilities regarding output messages, and distribution capabilities regarding received messages between low level units, then only a single communication channel is required for fail-safe operation. This is because the message received by one lower level unit can be distributed between the two units and voted upon.] For redundancy two communication channels are required. [If] *As* the low level units do not have voting capabilities regarding received messages between low level units, safety critical systems are sometimes structured so that at least two communication channels are necessary for fail-safe operation, and at least three communication channels are required to be active for redundancy in order to tolerate a single communication channel failure.

Conventional safety critical systems have system architectures that employ voting principles, such as those discussed. These safety critical systems have complicated system architectures because the employed voting principles require at least two channels in the safety critical system to be available at all times. Adding to the complexity, low level units are sometimes configured to individually communicate messages themselves. Some safety critical systems employ voting principles that require at least two communication channels to be active to provide interconnections to each low level unit for a 2oo3 to 2×2oo2 configuration. Other safety critical system architectures employ voting principles that require two communication channels to be active to provide interconnections to each high level unit so that each can communicate with a low level unit. [Additionally, some safety critical system architectures are further complicated by employing voting principles that require voting capabilities at the low level units.]

FIG. 1 is a diagram of a system 100 configured to provide simplified communication redundancy and/or reliability for safety critical systems, in accordance with one or more embodiments. The system 100 is configured to provide low level units that do not have voting capabilities while having only one minimum active communication channel for normal operating conditions, and only two minimum communication links to provide redundancy within the system 100 thereby improving system reliability.

The system 100 comprises a first high level unit 101 and a second high level unit 103. The first high level unit 101 and the second high level unit 103 are configured having voting and distribution capabilities. The first high level unit 101 is coupled to the second high level unit 103 by at least one comparison channel 105. The first high level unit 101 is configured to generate a first message and communicate the first message to a first low level unit 107. The first message is a voted message that comprises data content agreed upon between the first high level unit 101 and the second high level unit 103 through a voting process. A first channel 109 couples the first low level unit 107 to the first high level unit 101. The first message is communicated from the first high level unit 101 to the first low level unit 107 by way of the first channel 109.

The first high level unit 101 is also configured to generate and communicate a second message to the first low level unit 107. The second message is a voted message that comprises data content agreed upon between the first high level unit 101 and the second high level unit 103 through another voting process. A forwarding channel 113 couples a second low level unit 111 to the first low level unit 107. The second message is communicated from the first high level unit 101 to the second low level unit 111 by way of the first channel 109, the first low level unit 107, and the forwarding channel 113. [In some embodiments, the] *The* first low level unit 107 and the second low level unit 111 are incapable of voting.

In some embodiments, one or more of the first high level unit 101 or the second high level unit 103 protect the first message from unauthorized alteration, or unauthorized generation, by generating a first data protection code based on the data content of the first message. In some embodiments, at least two high level units such as first high level unit 101 and the second high level unit 103 generate the first data protection code. In some embodiments, the first data protection code is an error-checking code such as a cyclic redundancy check. Alternatively, the first data protection code is a different data protection scheme such as a security code or data encryption suitable for allowing processors to determine if a message has been corrupted, or is unreliable, based on a determination that the message has been generated by an unauthorized source. In some embodiments, the first data protection code is agreed upon between the first high level unit 101 and the second high level unit 103 through a voting process. In some embodiments, one or more of the first high level unit 101 or the second high level unit 103 generate a second data protection code based on the data content of the second message. In some embodiments, the second data protection code is an error-checking code such as a cyclic redundancy check. Alternatively, the second data protection code is a different data protection scheme such as a security code or data encryption suitable for allowing processors to determine if a message has been corrupted, or is unreliable, based on a determination that the message has been generated by an unauthorized source. In some embodiments, at least two high level units such as the first high level unit 101 and the second high level unit 103 generate the second data protection code. The first data protection code is different from the second data protection code. In some embodiments, the second data protection code is agreed upon between the first high level unit 101 and the second high level unit 103 through another voting process.

In some embodiments, the system 100 uses two different data protection codes so that a lower level unit, such as the first low level unit 107 or the second low level unit 111, that is not authorized to generate one of the first data protection code or the second data protection code, for example, is prevented from generating or altering a message that corresponds with the first data protection code or the second data protection code. For example, the second message communicated to the second low level unit 111 is secured by the second data protection code from alteration by the first low level unit 107. Similarly, the first low level unit 107 is incapable of generating the second message, or a message to be communicated and processed by the second low level unit 111 and/or the second high level unit 103, because the first low level unit 107 is not authorized or is incapable of generating the second data protection code. In some embodiments, to prevent alteration or generation of messages received or to be transmitted to a non-corresponding high level or low level unit, the message generation capabilities of the low level units is limited by limiting the availability of executable code (e.g., software instructions) that make it possible for a low level unit to understand a particular data protection code, or to generate a new data protection code, while still having the capability of forwarding and handling both the first and second data protection code, and the corresponding first and second messages.

In some embodiments, the first high level unit 101 and/or the second high level unit 103 are configured to determine that the first message and the second message are similar. The first high level unit 101 communicates the first message and the second message as a single message to the first low level unit 107 and to the second low level unit 111. The single message is, therefore, communicated to the second low level unit 111 by way of at least the first low level unit 107. The first data protection code and the second data protection code are communicated with the single message to secure communications between the first low level unit 107 and the first high level unit 101, and between the second low level unit 111 and the first high level unit 101. Sending the first message and the second message as a single message reduces a bandwidth consumed by the system 100.

In some embodiments, the first high level unit 101 and/or the second high level unit 103 are configured to determine whether the first message is different from the second message. Accordingly, the first message and the first data protection code are communicated together and separately from the second message and the second data protection code, which are communicated together.

The first low level unit 107 is configured to generate a first response message in response to the first message. The first low level unit 107 communicates the first response message to the first high level unit 101 by way of the first channel 109. The second low level unit 111 is configured to generate a second response message in response to the second message. The second low level unit 111 communicates the second response message to the first high level unit 101 by way of the forwarding channel 113, the first low level unit 107, and the first channel 109. In some embodiments, the first data protection code is further configured to correspond with the first response message, and the second data protection code is further configured to correspond with the second response message.

In some embodiments, the first high level unit 101 and/or the second high level unit 103 are configured to have voting capabilities to compare the first response message and the second response message. The first high level unit 101 and/or the second high level unit 103 have distribution capabilities to forward received messages to the other of the first high level unit 101 or the second high level unit 103, or other high level units that are part of the system 100 and/or correspond to the received message. In other embodiments, the first high level unit 101, the second high level unit 103, and/or other high level unit are configured to forward received messages to all of the high level units.

In some embodiments, the first high level unit 101, the second high level unit 103, the first low level unit 107, and the second low level unit 111 are periodically polled. A performance test is configured to identify whether the first high level unit 101, the second high level unit 103, the first low level unit 107, and the second low level unit 111 are operating normally or are malfunctioning. The performance test is also configured to identify whether the comparison channel 105, the first channel 109 and/or the forwarding channel 113 are in a failure mode. For example, if the first channel 109 is determined to be in a failure mode, the system 100 reverses the flow of communication between the first high level unit 101, the second high level unit 103, the first low level unit 107, and the second low level unit 111 such that communication flows through a second channel 115. The second channel 115 is configured to couple the second high level unit 103 to the second low level unit 111.

The first channel 109 is configured to remain active to facilitate communication between the first high level unit 101, the second high level unit 103, the first low level unit 107, and the second low level unit 111 during normal operation. But, the second channel 115 provides redundancy in the event that the first channel 109 is in the failure mode. As such, the system 100 operates normally using the first channel 109, and provides redundancy in interconnectivity using the second channel 115.

The system 100 is configured to provide redundant and reliable communications in safety critical systems while reducing bandwidth consumption compared to common safety critical systems. The system 100 is additionally configured to secure communications between corresponding high level and low level units by using individually generated data protection codes. The system 100 is configured to employ the 2oo2 to 2oo2 communication scheme. In some embodiments, the system 100 is capable of being modified to employ the 2oo3 to 2×2oo2 communication scheme, or other communication schemes which are applicable to communications in safety critical systems.

Figure 2:
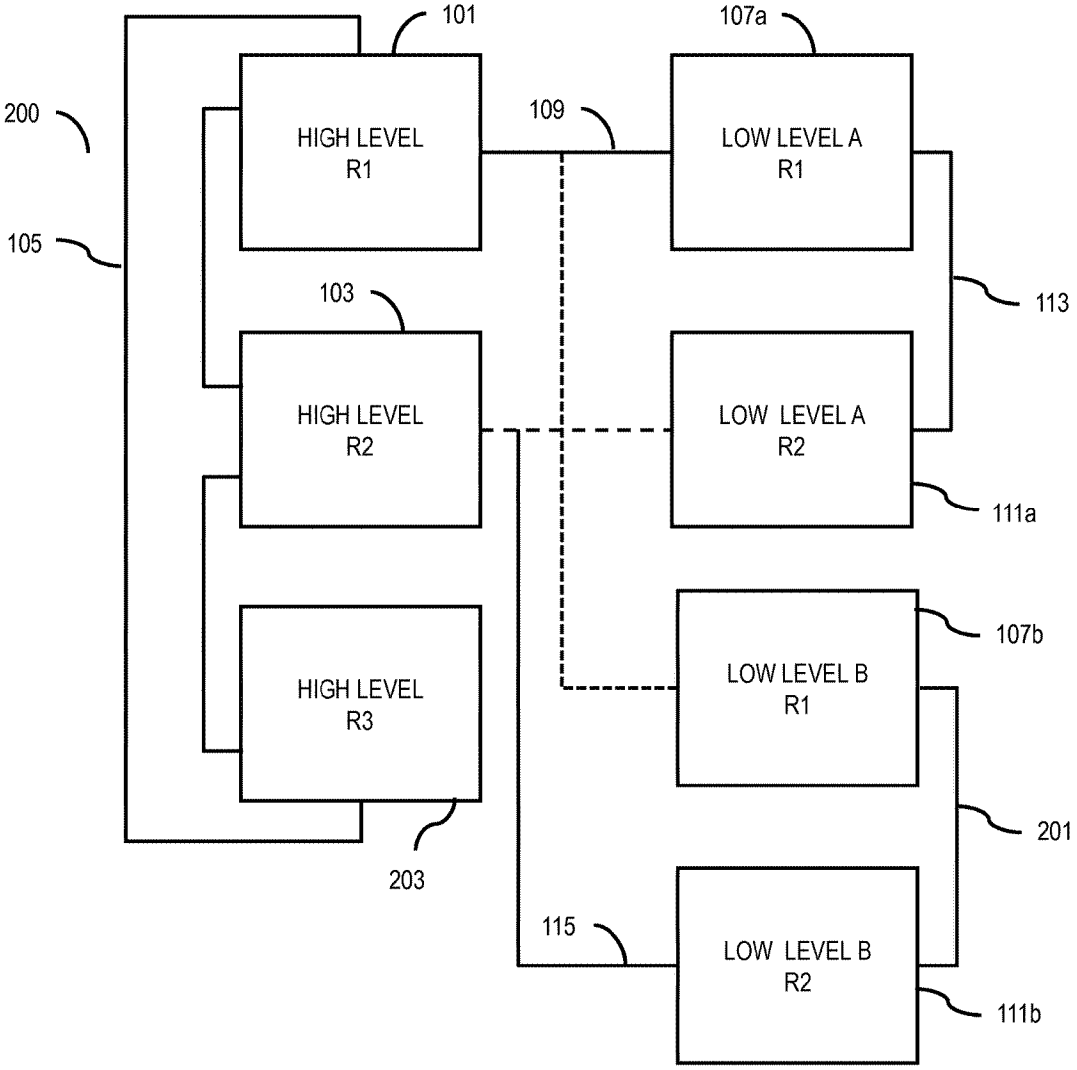
FIG. 2 is a diagram of a system configured to provide simplified communication for safety critical systems, in accordance with one or more embodiments.

FIG. 2 is a diagram of a system 200 configured to provide simplified communication redundancy and reliability for safety critical systems, in accordance with one or more embodiments. In some embodiments, the system 200 comprises many of the features of system 100 (FIG. 1). The first low level unit 107 is divided into two or more first subunits 107a and 107b. The second low level unit 111 is divided into two or more second subunits 111a and 111b. The first high level unit 101 is configured to communicate with the first subunits 107a and 107b by way of the first channel 109. The second high level unit 103 is configured to communicate with the second subunits 111a and 111b by way of the second channel 115. First subunit 107a is coupled to second subunit 111a by the forwarding channel 113. First subunit 107b is coupled to second subunit 111b by another forwarding channel 201.

In some embodiments, the first subunit 107a, first subunit 107b, second subunit 111a, and second subunit 111b are periodically polled. A performance test is configured to identify whether the first high level unit 101, the second high level unit 103, the first low level subunits 107a and 107b, and the second low level subunit 111a and 111b are operating normally or are malfunctioning. The performance test is also configured to identify whether the comparison channel 105, the first channel 109, the forwarding channel 113, and/or the other forwarding channel 201 are in a failure mode.

If, for example, one of the first channel 109 or the second channel 115 is determined to be inoperable (i.e., in the failure mode) based on the performance test, the first message or the second message is communicated to the first low level unit 107 (i.e., first subunits 107a and 107b) or the second low level unit 111 (i.e., second subunits 111a and 111b) by way of the other of the first channel 109 or the second channel 115 determined to be operable based on the performance test.

In some embodiments, the system 200 includes a third high level unit 203 configured to communicate with one or more of the first high level unit 101 or the second high level unit 103 by way of at least one comparison channel 105. The third high level unit 203 is configured to be a component that is included within the high level voting scheme such as that between first high level unit 101 and second high level unit 103 discussed with respect to FIG. 1. In the event that either of first high level unit 101 or second high level unit 103 fails, or enters into a failure mode, the system 200 includes the third high level unit 203 so that at least two high level units remain in operation. For example, if all three of first high level unit 101, second high level unit 103 and third high level unit 203 are in operation, the first high level unit 101, second high level unit 103 and third high level unit 203 are included within the high level voting scheme. If second high level unit 203 fails, then first high level unit 101 and third high level unit 203 are included in the high level voting scheme. If third high level unit 203 fails, then first high level unit 101 and second high level unit 103 are included in the high level voting scheme. In some embodiments, the third high level unit 203 is configured to facilitate diagnostic polling without impacting bandwidth consumed by communications between other units of the system 200, such as communications between the first high level unit 101 and the first low level unit 107.

Figure 3:
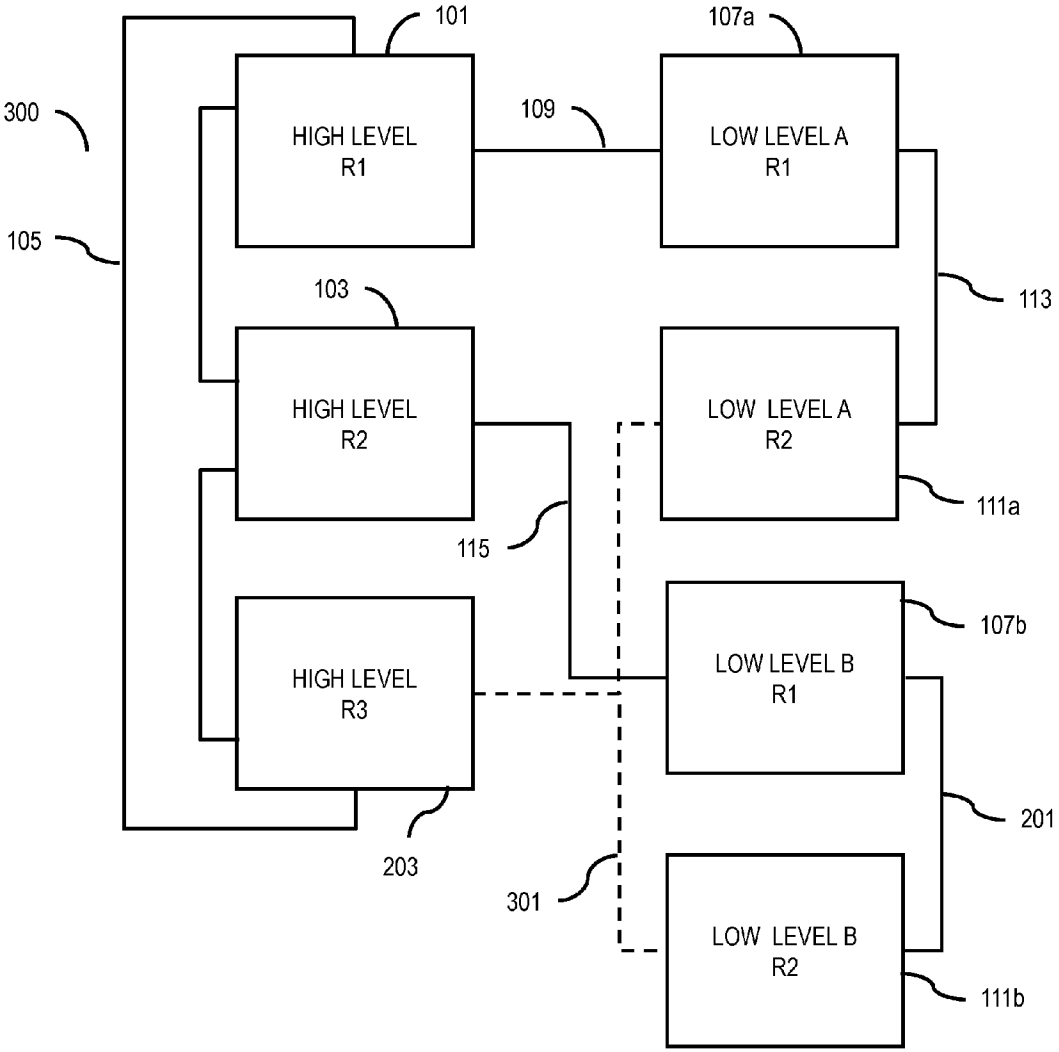
FIG. 3 is a diagram of a system configured to provide simplified communication for safety critical systems, in accordance with one or more embodiments.

FIG. 3 is a diagram of a system 300 configured to provide simplified communication redundancy and reliability for safety critical systems, in accordance with one or more embodiments.

In some embodiments, the system 300 comprises many of the features of system 100 (FIG. 1). The first low level unit 107 is divided into two or more first subunits 107a and 107. The second low level unit 111 is divided into two or more second subunits 111a and 111b. The first high level unit 101 is configured to communicate with the first subunits 107a and 107b by way of the first channel 109. The second high level unit 103 is configured to communicate with the second subunits 111a and 111b by way of the second channel 115. First subunit 107a is coupled to second subunit 111a by the forwarding channel 113. First subunit 107b is coupled to second subunit 111b by another forwarding channel 201.

In some embodiments, the first subunit 107a, first subunit 107b, second subunit 111a, and second subunit 111b are periodically polled. A performance test is configured to identify whether the first high level unit 101, the second high level unit 103, the first low level subunits 107a and 107b, and the second low level subunit 111a and 111b are operating normally or are malfunctioning. The performance test is also configured to identify whether the comparison channel 105, the first channel 109, the forwarding channel 113, and/or the other forwarding channel 201 are in a failure mode.

If, for example, one of the first channel 109 or the second channel 115 is determined to be inoperable (i.e., in the failure mode) based on the performance test, the first message or the second message is communicated to the first low level unit 107 (i.e., first subunits 107a and 107b) or the second low level unit 111 (i.e., second subunits 111a and 111b) by way of the other of the first channel 109 or the second channel 115 determined to be operable based on the performance test. The third high level unit 203 is coupled to the second subunit 111a and the second subunits 111b by a third channel 301.

In some embodiments, the third high level unit 203 is configured to be a component that is included within the high level voting scheme such as between first high level unit 101 and second high level unit 103 discussed with respect to FIG. 1. In the event that either of first high level unit 101 or second high level unit 103 fails, or enters into a failure mode, the system 300 includes the third high level unit 203 so that at least two high level units remain in operation. For example, if all three of first high level unit 101, second high level unit 103 and third high level unit 203 are in operation, the first high level unit 101, second high level unit 103 and third high level unit 203 are included within the high level voting scheme. If second high level unit 203 fails, then first high level unit 101 and third high level unit 203 are included in the high level voting scheme. If third high level unit 203 fails, then first high level unit 101 and second high level unit 103 are included in the high level voting scheme. In some embodiments, the third high level unit 203 is configured to facilitate diagnostic polling without impacting bandwidth consumed by communications between other units of the system 200, such as communications between the first high level unit 101 and the first low level unit 107a.

The third high level unit 203 is configured to relay communication between the first high level unit 101, the second high level unit 103, the first low level unit 107 (i.e., the first sub-units 107a and 107b), and the second low level unit 111 (i.e., second subunits 111a and 111b) by way of the third channel 301, and one or more additional comparison channels 105 coupling the third high level unit 203 to one or more of the first high level unit 101 or the second high level unit 103 based on a determination that one of the first channel 109 or the second channel 115 is inoperable.

Figure 4:
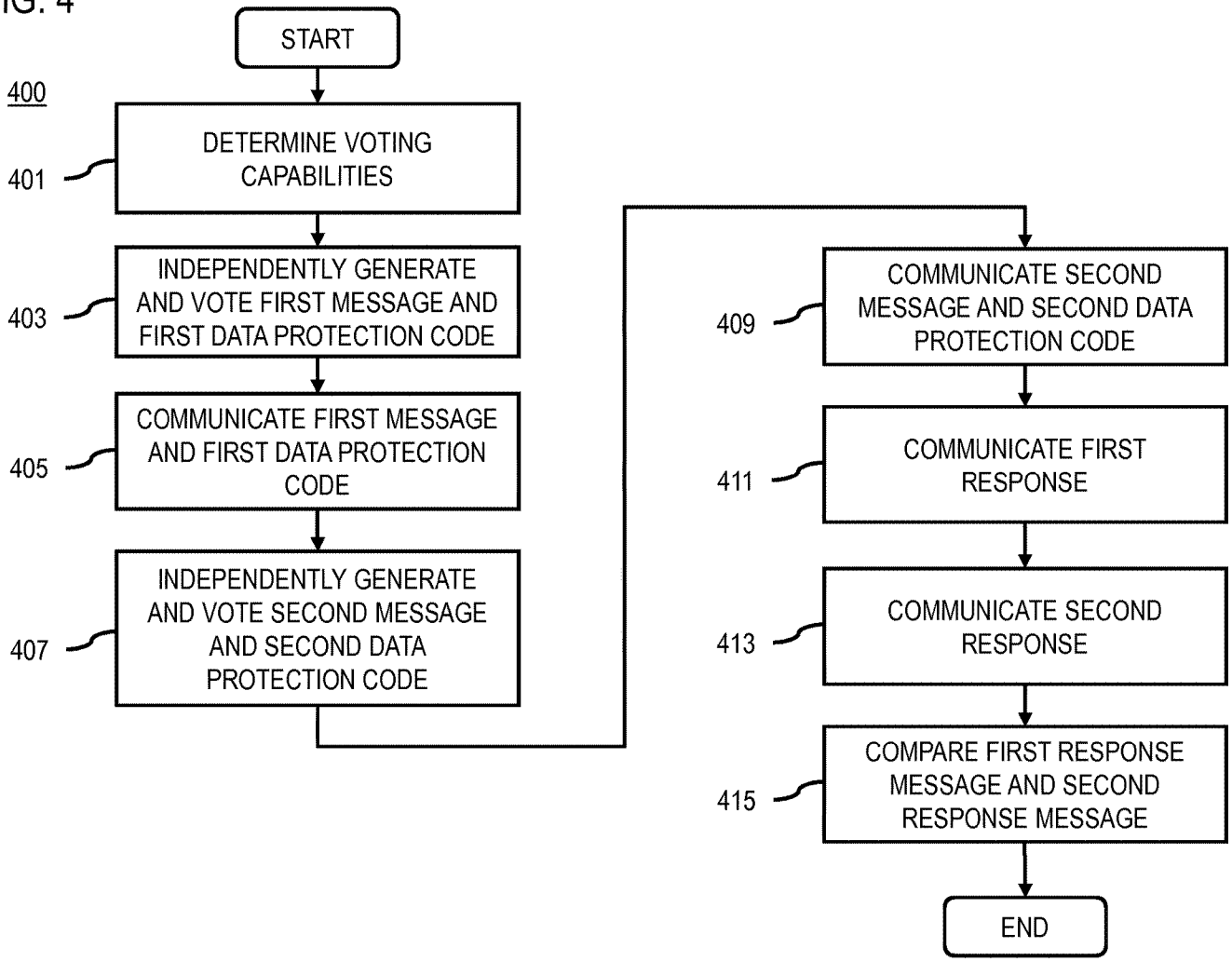
FIG. 4 is a flow chart of a method of providing simplified communication for safety critical systems.

FIG. 4 is a flow chart of a method 400 of providing simplified communication redundancy and reliability for safety critical systems, in accordance with one or more embodiments. Method 400 begins with step 401 in which a processor such as processor 603 (FIG. 6) or a control module implemented in chip set 600, executes an instruction to determine a first high level unit and a second high level unit are configured to have voting capabilities. At least one comparison channel couples the first high level unit to the second high level unit. In step 403, a first message having a first data protection code is generated by one or more of the first high level unit or the second high level unit. In some embodiments, the first data protection code is generated by at least two high level units such as the first high level unit and the second high level unit. The first high level unit and the second high level unit exchange the first message and the first data protection code, and vote on the data content of the first message via a voting process. In step 405, if the voting process is successful, the first message and first data protection code are communicated from the first high level unit to a first low level unit coupled to the first high level unit by a first channel. The first message is communicated from the first high level unit to the first low level unit by way of the first channel.

In step 407, a second message having a second data protection code is generated by one or more of the first high level unit or the second high level unit. In some embodiments, the second data protection code is generated by at least two high level units such as the first high level unit and the second high level unit. The first high level unit and the second high level unit exchange the second message and the second data protection code, and vote on the data content of the second message via another voting process. In step 409, if the voting process is successful, the second message and second data protection code are communicated from the first high level unit to a second low level unit coupled to the first low level unit by a forwarding channel. The second message is communicated from the first high level unit to the second low level unit by way of the first channel, the first low level unit, and the forwarding channel. The first data protection code and the second data protection code are configured to prevent unauthorized alteration of the first message or the second message. In some embodiments, the first data protection code and the second data protection code are communicated together with the first message and the second message.

In step 411, a first response message is communicated from the first low level unit to the first high level unit by way of the first channel. The first response message is generated by the first low level unit in response to the first message. In step 413, a second response message is communicated from the second low level unit to the first high level unit in response to the second message. The second response message is generated by the second low level unit and communicated from the second low level unit to the first high level unit by way of the forwarding channel, the first low level unit, and the first channel.

In step 415, the first response message and the second response message are compared based, at least in part, on the determination that the first high level unit and the second high level unit have voting capabilities.

Figure 5:
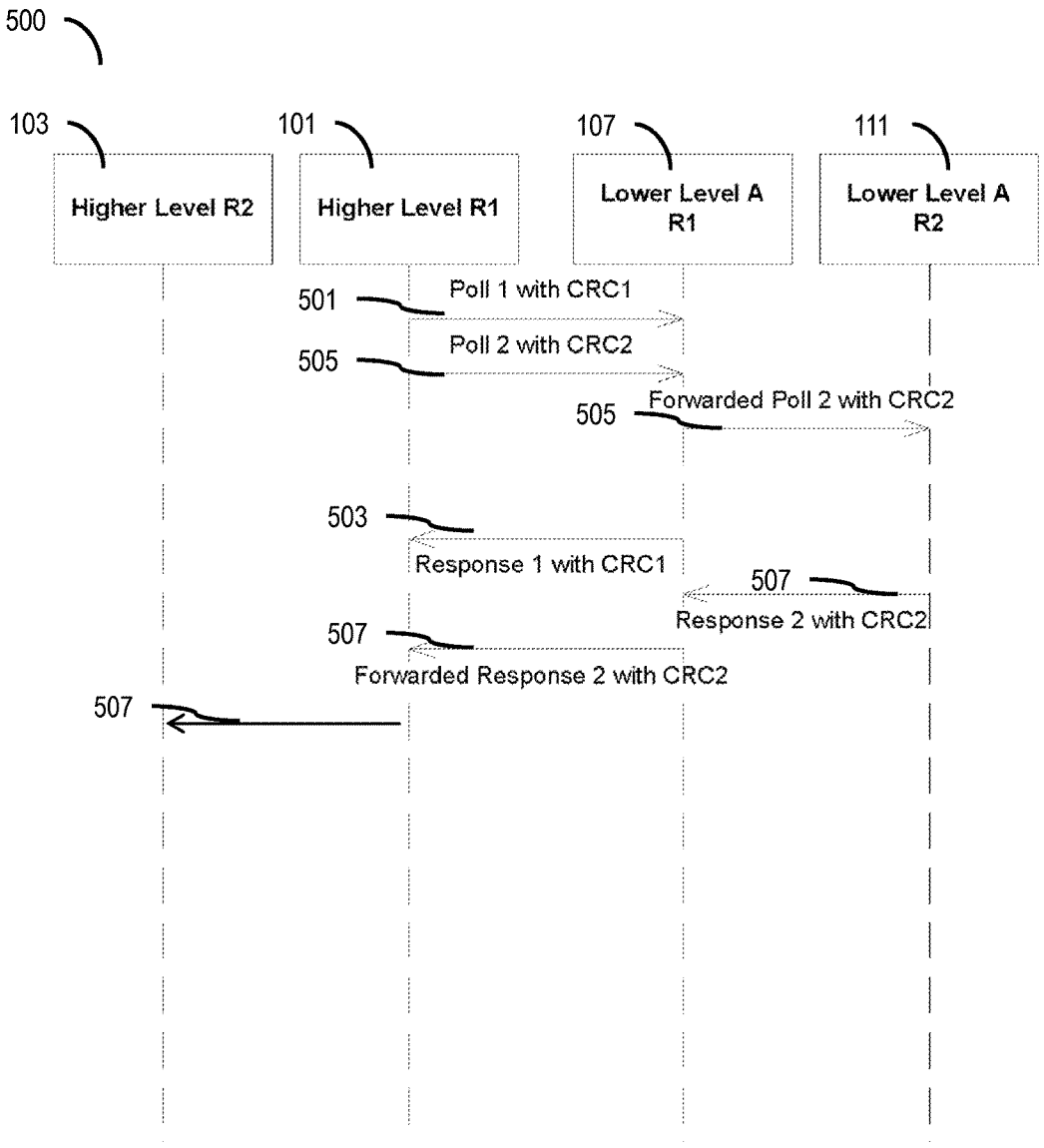
FIG. 5 is a process diagram of a method for performance testing of communication units in a safety critical system, in accordance with one or more embodiments.

FIG. 5 is a process diagram of a method 500 for performance testing of a security communication system, in accordance with one or more embodiments. In some embodiments, the first high level unit 101 communicates a first polling message 501 to the first low level unit 107. The first low level unit 107 responds to the first polling message 501 with a first performance message 503 indicative of an operating condition of the first low level unit 107 in response to the first polling message 501. The first performance message 503 is communicated from the first low level unit 107 to the first high level unit 101. The first performance message 503 is secured by the first data protection code. In this example, the first data protection code is illustrated as being a cyclic redundancy check (i.e., "CRC1"), but it should be understood that the first data protection code is not so limited.

The first high level unit 101 communicates a second polling message 505 to the second low level unit 111. The second polling message 505 is communicated to the second low level unit 111 by way of the first low level unit 107. The first high level unit 101 first communicates the second polling message 505 to the first low level unit 107. The first low level unit 107 relays or forwards the second polling message 505 to the second low level unit 111. The second low level unit 111 responds to the second polling message 505 with a second performance message 507 indicative of an operating condition of the second low level unit 111 in response to the second polling message 505. The second performance message 507 is communicated to the first high level unit 101 and optionally the second high level unit 103. The second performance message 507 is secured by the second data protection code. In this example, the second data protection code is illustrated as being a cyclic redundancy check (i.e., "CRC2"), but it should be understood that the second data protection code is not so limited. The second performance message 507 is first communicated to the first low level unit 107. The first low level unit 107 relays or forwards the second performance message 507 to the first high level unit 101. The first high level unit 101 processes or forwards the second performance message 507 to the second high level unit 103.

In some embodiments, a similar flow of communication occurs for other types of message communicated between the example first high level unit 101, second high level unit 103, first low level unit 107 and second low level unit 111.

The processes described herein for providing simplified communication redundancy and reliability for safety critical systems may be advantageously implemented via software in combination with hardware, hardware, firmware or a combination of software and firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
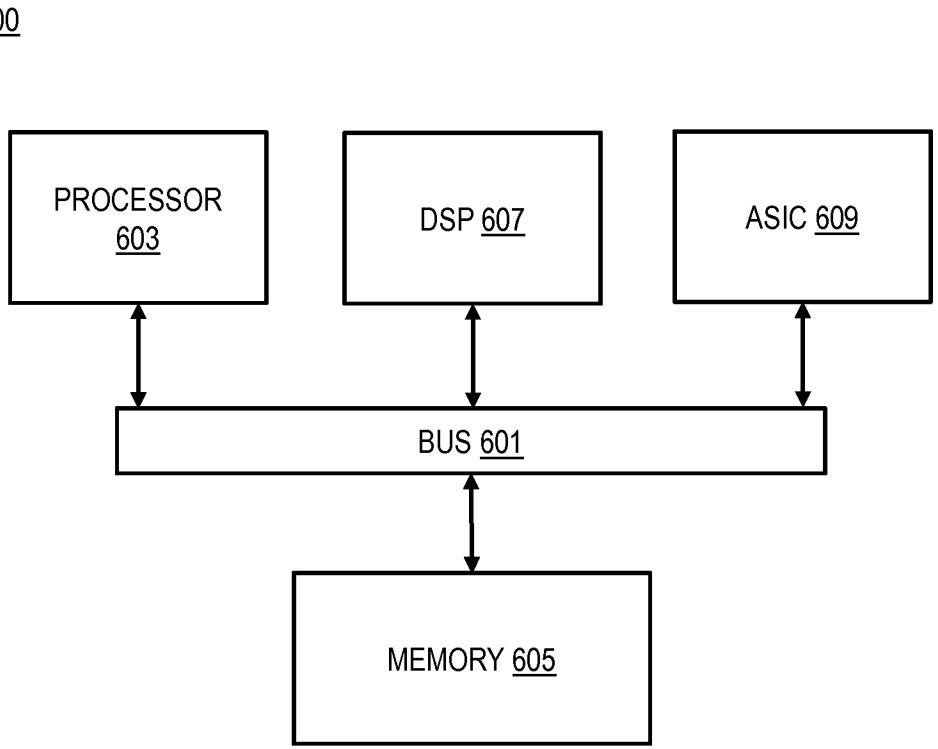
FIG. 6 illustrates a chip set or chip upon which or by which an embodiment is implemented in accordance with one or more embodiments.

FIG. 6 illustrates a chip set or chip 600 upon which or by which an embodiment is implemented. Chip set 600 is programmed to provide simplified communication redundancy and reliability for safety critical systems, as described herein, and includes, for example, bus 601, processor 603, memory 605, DSP 607 and ASIC 609 components.

The processor 603 and memory 605 are incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 are implemented in a single chip. It is further contemplated that in certain embodiments the chip set or chip 600 is implemented as a single "system on a chip." It is further contemplated that in certain embodiments a separate ASIC would not be used, for example, and that all relevant functions as disclosed herein would be performed by a processor or processors, e.g., processor 603. Chip set or chip 600, or a portion thereof, constitutes a mechanism for performing one or more steps of providing simplified communication redundancy and reliability for safety critical systems.

In one or more embodiments, the chip set or chip 600 includes a communication mechanism such as bus 601 for passing information among the components of the chip set 600. Processor 603 has connectivity to the bus 601 to execute instructions and process information stored in, for example, the memory 605. In some embodiments, the processor 603 is also accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 603 performs a set of operations on information as specified by computer program code related to providing simplified communication redundancy and reliability for safety critical systems. The computer program code is a set of instructions or statements providing instructions for the operation of the processor and/or the computer system to perform specified functions.

The processor 603 and accompanying components have connectivity to the memory 605 via the bus 601. The memory 605 includes one or more of dynamic memory (e.g., RAM, magnetic disk, writable optical disk, etc.) and static memory (e.g., ROM, CD-ROM, etc.) for storing executable instructions that when executed perform the steps described herein to provide simplified communication redundancy and reliability for safety critical systems. The memory 605 also stores the data associated with or generated by the execution of the steps.

In one or more embodiments, the memory 605, such as a random access memory (RAM) or any other dynamic storage device, stores information including processor instructions for providing simplified communication redundancy and reliability for safety critical systems. Dynamic memory allows information stored therein to be changed by system 100. RAM allows a unit of information stored at a location called a memory address to be stored and retrieved independently of information at neighboring addresses. The memory 605 is also used by the processor 603 to store temporary values during execution of processor instructions. In various embodiments, the memory 605 is a read only memory (ROM) or any other static storage device coupled to the bus 601 for storing static information, including instructions, that is not changed by the system 100. Some memory is composed of volatile storage that loses the information stored thereon when power is lost. In some embodiments, the memory 605 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 603, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, or another medium from which a computer can read. The term computer-readable storage medium is used herein to refer to a computer-readable medium.

One aspect of this description relates to a method executed by at least one processor, the method comprises generating a first message and a first data protection code corresponding to the first message by a first high level unit. The first high level unit is coupled to a second high level unit by at least one comparison channel. The first message comprises content agreed upon between the first high level unit and the second high level unit through a first voting process. The method further comprises communicating the first message and the first data protection code from the first high level unit to a first low level unit coupled to the first high level unit by a first channel. The first message is communicated from the first high level unit to the first low level unit by way of the first channel. The method additionally comprises generating a second message and a second data protection code corresponding to the second message by the first high level unit. The second message comprises content agreed upon between the first high level unit and the second high level unit through a second voting process. The method also comprises communicating the second message and the second data protection code from the first high level unit to a second low level unit coupled to the first low level unit by a forwarding channel. The second message is communicated from the first high level unit to the second low level unit by way of the first channel, the first low level unit, and the forwarding channel. The first data protection code and the second data protection code prevent unauthorized alteration of the first message or the second message.

Another aspect of this description relates to an apparatus comprising at least one processor, and at least one memory including computer program code for one or more programs, the at least one memory and the computer program code configured to, with the at least one processor, cause the apparatus to generate a first message and a first data protection code corresponding to the first message by a first high level unit. The first high level unit is coupled to a second high level unit by at least one comparison channel. The first message comprises content agreed upon between the first high level unit and the second high level unit through a first voting process. The apparatus is further caused to communicate the first message and the first data protection code from the first high level unit to a first low level unit coupled to the first high level unit by a first channel. The first message is communicated from the first high level unit to the first low level unit by way of the first channel. The apparatus is additionally caused to generate a second message and a second data protection code corresponding to the second message by the first high level unit. The second message comprises content agreed upon between the first high level unit and the second high level unit through a second voting process. The apparatus is also caused to communicate the second message and the second data protection code from the first high level unit to a second low level unit coupled to the first low level unit by a forwarding channel. The second message is communicated from the first high level unit to the second low level unit by way of the first channel, the first low level unit, and the forwarding channel. The first data protection code and the second data protection code prevent unauthorized alteration of the first message or the second message.

A further aspect of this description relates to a method executed by at least one processor, the method comprises generating a first message and protecting the first message with a first protection scheme corresponding to the first message by a first high level unit. The first high level unit is coupled to a second high level unit by at least one comparison channel. The first message comprises content agreed upon between the first high level unit and the second high level unit through a first voting process. The method further comprises communicating the first message and the first protection scheme from the first high level unit to a first low level unit coupled to the first high level unit by a first channel. The first message is communicated from the first high level unit to the first low level unit by way of the first channel. The method additionally comprises generating a second message and protecting the second message with a second protection scheme corresponding to the second message by the first high level unit. The second message comprises content agreed upon between the first high level unit and the second high level unit through a second voting process. The method also comprises communicating the second message and the second protection scheme from the first high level unit to a second low level unit coupled to the first low level unit by a forwarding channel. The second message is communicated from the first high level unit to the second low level unit by way of the first channel, the first low level unit, and the forwarding channel. The first protection scheme and the second protection scheme prevent unauthorized alteration of the first message or the second message.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. Although features of various embodiments are expressed in certain combinations among the claims, it is contemplated that these features can be arranged in any combination and order. It is therefore intended that the protection granted hereon be limited only by the definition contained in the appended claims and equivalents thereof.

What is claimed is:

1. A method executed by at least one processor, the method comprising:

generating a first message and a first data protection code corresponding to the first message [by a first high level unit, the first high level unit being coupled to a second high level unit by at least one comparison channel, the first message comprising content agreed upon between the first high level unit and the second high level unit through a first voting process];

communicating the first message and the first data protection code from [the] *a* first high level unit to a first low level unit coupled to the first high level unit by a first channel, *the first message comprising content agreed upon between the first high level unit and a second high level unit,* the first message being communicated from the first high level unit to the first low level unit by way of the first channel;

generating a second message and a second data protection code corresponding to the second message [by the first high level unit, the second message comprising content agreed upon between the first high level unit and the second high level unit through a second voting process];

communicating the second message and the second data protection code from the first high level unit to a second low level unit coupled to the first low level unit by a forwarding channel, *the second message comprising content agreed upon between the first high level unit and the second high level unit,* the second message being communicated from the first high level unit to the second low level unit by way of the first channel, the first low level unit, and the forwarding channel;

communicating a first response message from the first low level unit to the first high level unit by way of the first channel, the first response message being generated by the first low level unit in response to the first message;

communicating a second response message from the second low level unit to the first high level unit in response to the second message, the second response message being generated by the second low level unit and communicated from the second low level unit to the first high level unit by way of the forwarding channel, the first low level unit, and the first channel; and comparing the first response message and the second response message based, at least in part, on a determination that the first high level unit and the second high level unit have voting capabilities, wherein the first data protection code and the second data protection code prevent unauthorized alteration of the first message [or] *and* the second message*, respectively*.

2. The method of claim 1, wherein the first data protection code is further configured to correspond with the first response message, the second data protection code is further configured to correspond with the second response message, and the first data protection code and the second data protection code prevent unauthorized generation of the first response message [or] *and* the second response message*, respectively*.

3. The method of claim 1, wherein the first message and the second message are similar and communicated as a single message to the first low level unit and to the second low level unit by way of at least the first low level unit, and the first data protection code and the second data protection code are communicated with the single message to secure communications between the first low level unit and the first high level unit, and between the second low level unit and the first high level unit.

4. The method of claim 1, wherein the first message is different from the second message, the first message and the first data protection code are communicated together, and the second message and the second data protection code are communicated together.

5. The method of claim 1, further comprising:

[polling the second low level unit to conduct a performance test of the second low level unit;]

determining the first channel is in a failure mode *based on a result of a performance test of the second low level unit*; and reversing communications between the first high level unit, the second high level unit, the first low level unit, and the second low level unit to flow through a second channel, the second channel being configured to couple the second high level unit to the second low level unit.

6. The method of claim 1, wherein the first low level unit is divided into two or more first subunits and the second low level unit is divided into two or more second subunits, the first high level unit is configured to communicate with the first subunits by way of the first channel, the second high level unit is configured to communicate with the second subunits by way of a second channel, a first portion of the first subunits is coupled to a first portion of the second subunits by the forwarding channel, and a second portion of the first subunits is coupled to a second portion of the second subunits by another forwarding channel, the method further comprising:

polling the first portion of the first subunits and the second subunits to conduct a performance test;

determining one of the first channel or the second channel is inoperable based on the performance test; and communicating the first message or the second message to the first low level unit or the second low level unit by way of the other of the first channel or the second channel determined to be operable based on the performance test.

7. The method of claim 1, wherein the first low level unit is divided into two or more first subunits and the second low level unit is divided into two or more second subunits, the first high level unit is configured to communicate with a first portion of the first subunits by way of the first channel, the second high level unit is configured to communicate with a second portion of the first subunits by way of a second channel, the first portion of the first subunits is coupled to a first portion of the second subunits by the forwarding channel, the second portion of the first subunits is coupled to a second portion of the second subunits by another forwarding channel, and a third high level unit is coupled to the first portion of the second subunits and the second portion of the second subunits by a third channel, the method further comprising:

relaying communications between the first high level unit, the second high level unit, the first low level unit, and the second low level unit by way of the third high level unit, the third channel, and one or more [additional] comparison channels coupling the third high level unit to one or more of the first high level unit or the second high level unit based on a determination that one of the first channel or the second channel is inoperable based on a performance test.

8. An apparatus, comprising:

at least one processor; and at least one memory including computer program code for one or more programs, the at least one memory and the computer program code configured to, with the at least one processor, cause the apparatus to:

generate a first message and a first data protection code corresponding to the first message [by a first high level unit, the first high level unit being coupled to a second high level unit by at least one comparison channel, the first message comprising content agreed upon between the first high level unit and the second high level unit through a first voting process];

communicate the first message and the first data protection code from [the] *a* first high level unit to a first low level unit coupled to the first high level unit by a first channel, *the first message comprising content agreed upon between the first high level unit and a second high level unit,* the first message being communicated from the first high level unit to the first low level unit by way of the first channel;

generate a second message and a second data protection code corresponding to the second message [by the first high level unit, the second message comprising content agreed upon between the first high level unit and the second high level unit through a second voting process];

communicate the second message and the second data protection code from the first high level unit to a second low level unit coupled to the first low level unit by a forwarding channel, *the second message comprising content agreed upon between the first high level unit and the second high level unit,* the second message being communicated from the first high level unit to the second low level unit by way of the first channel, the first low level unit, and the forwarding *channel;* communicate a first response message from the first low level unit to the first high level unit by way of the first channel, the first response message being generated by the first low level unit in response to the first message;

communicate a second response message from the second low level unit to the first high level unit in response to the second message, the second response message being generated by the second low level unit and communicated from the second low level unit to the first high level unit by way of the forwarding channel, the first low level unit, and the first channel; and compare the first response message and the second response message based, at least in part, on a determination that the first high level unit and the second high level unit have voting capabilities, wherein the first data protection code and the second data protection code prevent unauthorized alteration of the first message [or] *and* the second message, *respectively*.

9. The apparatus of claim 8, wherein the first data protection code is further configured to correspond with the first response message, the second data protection code is further configured to correspond with the second response message, and the first data protection code and the second data protection code prevent unauthorized generation of the first response message [or] *and* the second response message, *respectively*.

10. The apparatus of claim 8, wherein the first message and the second message are similar and communicated as a single message to the first low level unit and to the second low level unit by way of at least the first low level unit, and the first data protection code and the second data protection code are communicated with the single message to secure communications between the first low level unit and the first high level unit, and between the second low level unit and the first high level unit.

11. The apparatus of claim 8, wherein the first message is different from the second message, the first message and the first data protection code are communicated together, and the second message and the second data protection code are communicated together.

12. The apparatus of claim 8, wherein the apparatus is further caused to:

[poll the second low level unit to conduct a performance test of the second low level unit;]

determine the first channel is in a failure mode *based on a result of a performance test of the second low level unit*; and reverse communications between the first high level unit, the second high level unit, the first low level unit, and the second low level unit to flow through a second channel, the second channel being configured to couple the second high level unit to the second low level unit.

13. The apparatus of claim 8, wherein the first low level unit is divided into two or more first subunits and the second low level unit is divided into two or more second subunits, the first high level unit is configured to communicate with the first subunits by way of the first channel, the second high level unit is configured to communicate with the second subunits by way of a second channel, a first portion of the first subunits is coupled to a first portion of the second subunits by the forwarding channel, and a second portion of the first subunits is coupled to a second portion of the second subunits by another forwarding channel, and the apparatus is further caused to:

poll the first portion of the first subunits and the second subunits to conduct a performance test;

determine one of the first channel or the second channel is inoperable based on the performance test; and communicate the first message or the second message to the first low level unit or the second low level unit by way of the other of the first channel or the second channel determined to be operable based on the performance test.

14. The apparatus of claim 8, wherein the first low level unit is divided into two or more first subunits and the second low level unit is divided into two or more second subunits, the first high level unit is configured to communicate with a first portion of the first subunits by way of the first channel, the second high level unit is configured to communicate with a second portion of the first subunits by way of a second channel, the first portion of the first subunits is coupled to a first portion of the second subunits by the forwarding channel, the second portion of the first subunits is coupled to a second portion of the second subunits by another forwarding channel, and a third high level unit is coupled to the first portion of the second subunits and the second portion of the second subunits by a third channel, and the apparatus is further caused to:

relay communications between the first high level unit, the second high level unit, the first low level unit, and the second low level unit by way of the third high level unit, the third channel, and one or more [additional] comparison channels coupling the third high level unit to one or more of the first high level unit or the second high level unit based on a determination that one of the first channel or the second channel is inoperable based on a performance test.

15. A method executed by at least one processor, the method comprising:

generating a first message and protecting the first message with a first protection scheme corresponding to the first message [by a first high level unit, the first high level unit being coupled to a second high level unit by at least one comparison channel, the first message comprising content agreed upon between the first high level unit and the second high level unit through a first voting process];

communicating the first message and the first protection scheme from [the] *a* first high level unit to a first low level unit coupled to the first high level unit by a first channel, *the first message comprising content agreed upon between the first high level unit and a second high level unit,* the first message being communicated from the first high level unit to the first low level unit by way of the first channel;

generating a second message and protecting the second message with a second protection scheme corresponding to the second message [by the first high level unit, the second message comprising content agreed upon between the first high level unit and the second high level unit through a second voting process];

communicating the second message and the second protection scheme from the first high level unit to a second low level unit coupled to the first low level unit by a forwarding channel, *the second message comprising content agreed upon between the first high level unit and the second high level unit,* the second message being communicated from the first high level unit to the second low level unit by way of the first channel, the first low level unit, and the forwarding channel;

polling the second low level unit to conduct a performance test of the second low level unit;

determining the first channel is in a failure mode; and reversing communications between the first high level unit, the second high level unit, the first low level unit, and the second low level unit to flow through a second channel, the second channel being configured to couple the second high level unit to the second low level unit, wherein the first protection scheme and the second protection scheme prevent unauthorized alteration of the first message [or] *and* the second message*, respectively*.

16. The apparatus of claim 8, wherein the first data protection code is different from the second data protection code.

17. The apparatus of claim 16, wherein the first low-level unit is unable to generate the second data protection code or a [third] *new* data protection code, and the inability of the first low-level unit to generate the second data protection code or the [third] *new* data protection code prevents the first low-level unit from generating a false message to be communicated to or processed by one or more of the second low-level unit or the second high-level unit.

[18. The method of claim 1, wherein the first low-level unit and the second low-level unit are free from having voting capabilities.]

[19. The method of claim 8, wherein the first low-level unit and the second low-level unit are free from having voting capabilities.]

[20. The method of claim 15, wherein the first low-level unit and the second low-level unit are free from having voting capabilities.]

21. The method of claim 15, further comprising:

communicating a first response message from the first low level unit to the first high level unit by way of the first channel, the first response message being generated by the first low level unit in response to the first message;

communicating a second response message from the second low level unit to the first high level unit in response to the second message, the second response message being generated by the second low level unit and communicated from the second low level unit to the first high level unit by way of the forwarding channel, the first low level unit, and the first channel; and comparing the first response message and the second response message based, at least in part, on a determination that the first high level unit and the second high level unit have voting capabilities.

*22. The method of claim 15, wherein the performance test is configured to identify whether the second high level unit is operating normally or is malfunctioning.*

*23. The method of claim 1, wherein*

*said generating the first message and the first data protection code is performed by the first high level unit,*

*the first high level unit is coupled to the second high level unit by at least one comparison channel,*

*the first message comprises the content agreed upon between the first high level unit and the second high level unit through a first voting process, and*

*the second message comprises the content agreed upon between the first high level unit and the second high level unit through a second voting process.*

*24. The apparatus of claim 8, wherein*

*the at least one memory and the computer program code are configured to, with the at least one processor, cause the apparatus to generate the first message and the first data protection code by the first high level unit,*

*the first high level unit is coupled to the second high level unit by at least one comparison channel,*

*the first message comprises the content agreed upon between the first high level unit and the second high level unit through a first voting process, and*

*the second message comprises the content agreed upon between the first high level unit and the second high level unit through a second voting process.*

*25. The method of claim 15, wherein*

*said generating the first message and said protecting the first message with the first protection scheme are performed by the first high level unit, the first high level unit being coupled to the second high level unit by at least one comparison channel, the first message comprising the content agreed upon between the first high level unit and the second high level unit through a first voting process; and*

*said generating the second message and said protecting the second message with the second protection scheme are performed by the first high level unit, the second message comprising the content agreed upon between the first high level unit and the second high level unit through a second voting process.*

* * * * *